(12) United States Patent
Iwabuchi et al.

(10) Patent No.: US 6,703,121 B2
(45) Date of Patent: Mar. 9, 2004

(54) ADHESIVE SHEET FOR PRECISION ELECTRONIC MEMBER

(75) Inventors: Hiroaki Iwabuchi, Saitama (JP); Kiyoshi Ishiba, Saitama (JP); Tatsuya Tsukida, Saitama (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 10/116,028

(22) Filed: Apr. 5, 2002

(65) Prior Publication Data

US 2002/0187343 A1 Dec. 12, 2002

(30) Foreign Application Priority Data

Apr. 19, 2001 (JP) ........................................ 2001-121507

(51) Int. Cl.$^7$ ............................................... B32B 27/30
(52) U.S. Cl. ................. 428/355 AC; 428/221; 428/41.8; 427/384; 427/385.5
(58) Field of Search .......................... 428/355 AC, 221, 428/41.8; 427/384, 385.5

(56) References Cited

U.S. PATENT DOCUMENTS

| | | |
|---|---|---|
| 5,183,841 A | 2/1993 | Bernard |
| 6,040,026 A | 3/2000 | Iwabuchi et al. |

FOREIGN PATENT DOCUMENTS

| | | |
|---|---|---|
| DE | 43 24 357 | 11/1994 |
| EP | 0 819 713 | 1/1998 |
| EP | 0 989 173 | 3/2000 |
| EP | 1 016 680 | 7/2000 |
| JP | 3-177473 | 8/1991 |
| JP | 3-281586 | 12/1991 |
| JP | 10-158615 | 6/1998 |
| JP | 10-251609 | 9/1998 |
| JP | 2001-172590 | 6/2001 |
| WO | WO 01/98383 | 12/2001 |
| WO | WO 02/02709 | 1/2002 |

*Primary Examiner*—Robert Dawson
*Assistant Examiner*—Christopher Keehan
(74) *Attorney, Agent, or Firm*—Oblon, Spivak, McClelland, Maier & Neustadt, P.C.

(57) ABSTRACT

Provided is an adhesive sheet for a precision electronic member which generates less amount of gas under high temperature atmosphere and which is suited as a low polluting adhesive sheet for a precision electronic member. The adhesive sheet for a precision electronic member has an adhesive layer comprising an acrylic copolymer obtained by copolymerizing a monomer mixture which comprises alkyl (meth)acrylate having 4 or less carbon atoms in an alkyl group and vinyl acetate in a proportion of 50:50 to 99.5:0.5 in terms of a weight ratio and in which a total content thereof is 80% by weight or more, wherein an amount of gas generated in heating at a temperature of 120° C. for 10 minutes is 1.0 $\mu g/cm^2$ or less in terms of a n-decane amount.

17 Claims, No Drawings

ADHESIVE SHEET FOR PRECISION ELECTRONIC MEMBER

BACKGROUND OF THE INVENTION

The present invention relates to an adhesive sheet for a precision electronic member. More specifically, the present invention relates to an adhesive sheet for a precision electronic member which generates less amount of gas under high temperature atmosphere and which is suited as a low polluting adhesive sheet for a precision electronic member.

RELATED ART

In recent years, an adhesive sheet is used in a variety of the fields because it has such easiness in use that it does not have to change in a state (for example, from a liquid to a solid) in use as is the case with conventional adhesives and exhibits an adhesive strength which stands practical use immediately after stuck (pressure-sensitive tack) and because it has such non-pollution, safety and good workability that a solvent and heating are not required in use.

Capable of being given as uses of this adhesive sheet are, for example, packaging and binding, business and household, bonding, masking for painting, surface protection, corrosion prevention and water proofing, sealing, electrical insulation, electronic appliances and optical parts, medical and sanitary material, distinguishing and decoration and labeling.

In recent years, particularly in the field of a precision electronic member, a diversification in products and a reduction in lots are advanced, and it has come to be carried out in many cases to stick adhesive labels on which, for example, bar codes are printed onto respective members for production control or to use an adhesive double coated sheet for bonding the members or to use an adhesive sheet for electric insulation. Such adhesive sheet used for a precision electronic member is required not to contaminate the above precision electronic member by gas generated from an adhesive layer. This is because the inside of an electronic appliance equipped with a precision electronic member is exposed to high temperature atmosphere in use in a certain case and gas generated from an adhesive sheet stuck onto the precision electronic member under such high temperature atmosphere causes bringing about such undesirable situation as corrosion and malfunction of the above member.

DISCLOSURE OF THE INVENTION

The present invention has been made under such circumstances, and an object thereof is to provide an adhesive sheet for a precision electronic member which generates less amount of gas under high temperature atmosphere and which is suited as a low polluting adhesive sheet for a precision electronic member.

Intensive researches of a low polluting adhesive sheet repeated by the present inventors have resulted in finding that capable of meeting the object described above is an adhesive sheet in which an adhesive comprising an acrylic copolymer having a specific composition is used for an adhesive layer and in which a gas-generating amount measured on a specific condition is controlled to some value or lower. The present invention has been completed based on such knowledge.

That is, the present invention provides:

(1) an adhesive sheet for a precision electronic member which has an adhesive layer comprising an acrylic copolymer and in which an amount of gas generated in heating at a temperature of 120° C. for 10 minutes is 1.0 $\mu g/cm^2$ or less in terms of a n-decane amount, wherein the acrylic copolymer described above is prepared by copolymerizing a monomer mixture which comprises alkyl (meth)acrylate having 4 or less carbon atoms in an alkyl group and vinyl acetate in a proportion of 50:50 to 99.5:0.5 in terms of a weight ratio and in which a total content thereof is 75% by weight or more, (2) the adhesive sheet for a precision electronic member as described in the above item (1), wherein the acrylic copolymer is prepared by copolymerizing alkyl (meth)acrylate having 4 or less carbon atoms in an alkyl group and vinyl acetate with a monomer having a crosslinkable group, and (3) the adhesive sheet for a precision electronic member as described in the above item (1), wherein the weight average molecular weight of the acrylic copolymer is 150,000 or more.

EMBODIMENT OF THE INVENTION

The adhesive layer in the adhesive sheet of the present invention is constituted from an adhesive comprising an acrylic copolymer, and the above acrylic copolymer comprises alkyl (meth)acrylate having 4 or less carbon atoms in an alkyl group and vinyl acetate as essential monomers. In this respect, the alkyl (meth)acrylate having 4 or less carbon atoms in an alkyl group includes, for example, methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate and t-butyl (meth)acrylate. They may be used alone or in combination of two or more kinds thereof. If the alkyl (meth)acrylate has 5 or more carbon atoms in an alkyl group, a low polluting adhesive sheet in which a gas-generating amount is controlled to a prescribed value or lower is less liable to be obtained.

The function of vinyl acetate copolymerized with these alkyl (meth)acrylates is not necessarily apparent, and it is considered that vinyl acetate has a low polymerization reactivity in itself, so that it has a function to make a polymerization reaction of other monomers to proceed a residual amount of the unreacted other monomers. Even if vinyl acetate having a low polymerization reactivity remains as an unreacted monomer in the adhesive, the above vinyl acetate, which has as low boiling point as 73° C., is volatilized in heating and drying in forming an adhesive layer and therefore does not exert an adverse effect on the gas-generating amount.

In the present invention, the monomer mixture which comprises alkyl (meth)acrylate having 4 or less carbon atoms in an alkyl group and vinyl acetate in a proportion of 50:50 to 99.5:0.5 in terms of a weight ratio and in which a total content thereof is 75% by weight or more is polymerized to produce the acrylic copolymer. If a use amount of vinyl acetate is lower than the range described above, the effect of copolymerizing vinyl acetate is not exhibited, and the object of the present invention can not be achieved. On the other hand, if it exceeds the range described above, the performance thereof as an adhesive is unsatisfactory. Because of these reasons, a proportion of the above alkyl (meth)acrylate to vinyl acetate is preferably 70:30 to 99:1, particularly preferably 80:20 to 90:10 in terms of a weight ratio.

Further, if a total content of alkyl (meth)acrylate having 4 or less carbon atoms in an alkyl group and vinyl acetate in the monomer mixture is less than 75% by weight, the performance as an adhesive is unsatisfactory or the gas-generating amount grows larger depending on the kind of the other monomers, and the desired low polluting adhesive sheet is not obtained in a certain case.

In the present invention, other copolymerizable monomers can be used, if necessary, together with the alkyl (meth)acrylate and vinyl acetate each described above as long as the object of the present invention is not damaged. The copolymerizable monomers include, for example, monomers having cross-linking functional groups or olefins such as ethylene, propylene and isobutylene; halogenated olefins such as vinyl chloride and vinylidene chloride; styrene monomers such as styrene and c-methylstyrene; diene monomers such as butadiene, isoprene and chloroprene; nitrile monomers such as acrylonitrile and methacrylonitrile; and N,N-dialkyl-substituted acrylamides such as N,N-dimethylacrylamide and N,N-dimethylmethacrylamide. Among these copolymerizable monomers, monomers having cross-linking functional groups are preferred, and these monomers having cross-linking functional groups include, for example, hydroxyalkyl (meth)acrylates such as 2-hydroxyethyl (meth)acrylate, 2-hydroxypropyl (meth)acrylate and 3-hydroxypropyl (meth)acrylate; acrylamides such as acrylamide, methacrylamide, N-methylacrylamide, N-methylmethacrylamide, N-methylolacrylamide and N-methylolmethacrylamide; and ethylenically unsaturated carboxylic acids such as acrylic acid, methacrylic acid, crotonic acid, maleic acid, itaconic acid and citraconic acid.

These copolymerizable monomers may be used alone or in combination of two or more kinds thereof, and a use amount thereof is 25% by weight or less based the weight of the whole monomers.

In the present invention, the acrylic copolymer used for the adhesive is preferably produced by radically polymerizing the monomer mixture described above using a conventionally known azo or peroxide radical polymerization initiator. An amount of the radical polymerization initiator is suitably 0.01 to 5 parts by weight, preferably 0.1 to 1 part by weight per 100 parts by weight of the monomer mixture. The polymerization form of the acrylic copolymer thus obtained shall not specifically be restricted and may be any of random, block and graft copolymers. The molecular weight is selected in a range of preferably 150,000 or more, more preferably 300,000 to 1,500,000 in terms of a weight average molecular weight. If this weight average molecular weight is less than 150,000, the adhesive is likely to be inferior in a heat resistance and unsatisfactory in an adhesive strength against an adherend.

The weight average molecular weight described above is a value reduced to polystyrene measured by gel permeation chromatography (GPC).

The adhesive in the present invention comprises the acrylic copolymer described above as a resin component, and it further comprises preferably a cross-linking agent together with this acrylic copolymer. The above cross-linking agent includes, for example, isocyanate cross-linking agents, epoxy cross-linking agents, metal chelate cross-linking agents, aziridine cross-linking agents and amine resins.

In this respect, the examples of the isocyanate cross-linking agents include tolylenediisocyanate (TDI), hexamethylenediisocyanate (HMDI), isophoronediisocyanate (IPDI), xylylenediisocyanate (XDI), hydrogenated tolylenediisocyanate, diphenylmethanediisocyanate and trimethylolpropane-modified TDI. The examples of the epoxy cross-linking agents include ethylene glycol diglycidyl ether, 1,6-hexanediol diglycidyl ether, trimethylolpropane diglycidyl ether, diglycidylaniline and diglycidylamine. The examples of the metal chelate cross-linking agents include chelate compounds comprising acetylacetone and acetone acid esters of divalent or higher metals such as aluminum, copper, iron, tin, zinc, titanium, nickel, antimony, magnesium, vanadium, chromium and zirconium. The examples of the aziridine cross-linking agents include trimethylolpropane-tri-β-aziridinylpropionate and bisisophthaloyl-1-(2-methylaziridine).

These cross-linking agents may be used alone or in combination of two or more kinds thereof. A use amount of the cross-linking agent is suitably 0.01 to 20 parts by weight per 100 parts by weight of the acrylic copolymer, and permanent adhesion type and removable type adhesives can be prepared by controlling a use amount of the cross-linking agent. Further, the adhesive in the present invention can be blended, if necessary, with various addition components which have so far conventionally been used for an acrylic adhesive as long as the object of the present invention is not damaged.

The adhesive sheet of the present invention has the adhesive layer thus prepared. The form thereof shall not specifically be restricted, and capable of being used is any of a sheet having an adhesive layer on one face of a base sheet, a sheet having adhesive layers on both faces of a base sheet, a sheet in which an adhesive layer is interposed between two release sheets without using a base sheet and a sheet in which an adhesive layer is provided on one face of a release sheet subjected to release treatment on both faces thereof and which is rolled.

A thickness of the adhesive layer described above shall not specifically be restricted and is suitably selected according to uses of the adhesive sheet. It is selected in a range of usually 5 to 200 μm, preferably 10 to 130 μm. This adhesive layer is preferably formed by coating the adhesive by a conventionally known method, for example, a method such as a spin coating method, a spray coating method, a bar coating method, a knife coating method, a roll coating method, a blade coating method, a die coating method and a gravure coating method and then heating it at a temperature of 80 to 150° C. for 30 seconds to 5 minutes in order to prevent a solvent and low boiling components from remaining.

The base sheet described above shall not specifically be restricted, and various ones can be used. To be specific, used are polyethylene, polypropylene, polyesters such as polyethylene terephthalate, metal-deposited polyesters, synthetic paper, woodfree paper, impregnated paper, metallic foils such as aluminum foil, copper foil and iron foil and porous materials such as nonwoven fabrics. A thickness of these base sheets shall not specifically be restricted, and it is usually 3 to 250 μm and falls in a range of preferably 10 to 200 μm in terms of easiness in handling.

In the adhesive sheet of the present invention, a release sheet can be provided, if necessary, on the adhesive layer. This release sheet is prepared by using woodfree paper, clay coat paper, woodfree paper laminated with polyethylene or polypropylene, woodfree paper subjected to filling treatment with cellulose, starch, polyvinyl alcohol or an acryl-styrene resin or a plastic film of polyethylene, polypropylene or polyester such as polyethylene terephthalate and subjecting one face or both faces thereof to releasing treatment. A release agent used for the above releasing treatment are, for example, olefin resins, a long chain alkyl, a fluorine and a silicone resin. In particular, when the above adhesive sheet is used in production process of a hard disc or used as a production control label for a hard disc, a silicone release agent is transferred to an adhesive layer in a trace amount, and a silicon component thereof is adhered to a hard disc apparatus; and it forms an oxide thereof on a recording disc and a read head in the hard disc apparatus, which results in breaking the above hard disc apparatus in a certain case. Accordingly, when the above adhesive sheet is used for uses in a hard disc, a non-silicone release agent is preferably used. Further, when the silicone release agent is used as a release agent, the agent having less silicone component transferred to the adhesive layer is preferably selected.

In the adhesive sheet of the present invention, an amount of gas generated in heating at a temperature of 120° C. for 10 minutes is 1.0 $\mu g/cm^2$ or less in terms of a n-decane amount. If this gas-generating amount exceeds 1.0 $\mu g/cm^2$, corrosion and malfunction of a precision electronic member on which the above adhesive sheet is stuck are brought about in a certain case.

When the above adhesive sheet has a release sheet, the gas-generating amount described above is a value measured after peeling and removing the above release sheet. A specific method for measuring gas generated shall be explained later.

Capable of being given as a precision electronic member to which the adhesive sheet of the present invention is applied are, for example, hard disc apparatuses, semiconductor parts such as an extension memory and an IC card, semiconductor production apparatuses, relay switches and circuit boards.

EXAMPLES

Next, the present invention shall be explained in further details with reference to examples, but the present invention shall by no means be restricted by these examples.

Example 1

(1) Preparation of Acrylic Copolymer Solution

A reactor equipped with a thermometer, a stirrer, a reflux condenser and a nitrogen gas-introducing tube was charged with 88 parts by weight of butyl acrylate (BA), 2 parts by weight of acrylic acid (AA), 10 parts by weight of vinyl acetate (VA) and 150 parts by weight of ethyl acetate as a solvent, and 0.3 part by weight of azobisisobutyronitrile was further added thereto as a radical polymerization initiator to polymerize them at 80° C. for 8 hours under nitrogen gas atmosphere. After finishing the reaction, toluene was added to prepare an acrylic copolymer solution having a solid matter concentration of 32% by weight. The acrylic copolymer thus obtained had a molecular weight of 300,000 in terms of a weight average molecular weight converted to polystyrene which was measured by gel permeation chromatography (GPC) (hereinafter, the same shall apply).

(2) Production of Adhesive Sheet

A mixture of low density polyethylene ([fukaron LK-30], manufactured by Mitsui Chemical Co., Ltd.) and an ethylene-α-olefin copolymer ([P-0280], manufactured by Mitsui Chemical Co., Ltd.) in a weight ratio of 50:50 was laminated as a release layer on one face of woodfree paper having a weight of 70 $g/m^2$ in a thickness of 30 $\mu m$ by an extrusion laminate method (melt temperature: 300° C.) to prepare a release sheet.

On the other hand, an aluminum chelate cross-linking agent ([M-5A], manufactured by Soken Chemical Co., Ltd.) 1.5 part by weight was added to 100 parts by weight of the acrylic copolymer solution obtained in (1) described above to prepare an adhesive.

Next, the adhesive described above was coated on a back face of a polyethylene terephthalate (PET) film having a thickness of 50 $\mu m$ ([Cosmoshine A4100], manufactured by Toyo Boseki Co., Ltd.) by a bar coating method using a Mayer bar so that a thickness after drying was 25 $\mu m$, and it was heated and dried at 110° C. for one minute to form an adhesive layer. Then, the release sheet described above was provided thereon by means of a laminator so that the adhesive layer was brought into contact with the release layer to prepare an adhesive sheet.

Example 2

(1) Preparation of Acrylic Copolymer Solution

The same reactor as in Example 1 was used and charged with 30 parts by weight of ethyl acrylate (EA), 65 parts by weight of butyl acrylate, 2 parts by weight of acrylic acid, 3 parts by weight of vinyl acetate and 150 parts by weight of ethyl acetate, and 0.3 part by weight of azobisisobutyronitrile was further added thereto to polymerize them at 80° C. for 8 hours under nitrogen gas atmosphere. After finishing the reaction, toluene was added to prepare an acrylic copolymer solution having a solid matter concentration of 34% by weight. The acrylic copolymer thus obtained had a weight average molecular weight of 350,000.

(2) Production of Adhesive Sheet

An isocyanate cross-linking agent ([Colonate L], manufactured by Nippon Polyurethane Co., Ltd.) 3 parts by weight was added to 100 parts by weight of the acrylic copolymer solution obtained in (1) described above to prepare an adhesive.

An adhesive sheet was prepared in the same manner as in Example 1 (2), except that this adhesive was used.

Example 3

(1) Preparation of Acrylic Copolymer Solution

The same reactor as in Example 1 was used and charged with 20 parts by weight of ethyl acrylate, 48 parts by weight of butyl acrylate, 2 parts by weight of acrylic acid, 30 parts by weight of vinyl acetate and 150 parts by weight of ethyl acetate, and 0.3 part by weight of benzoyl peroxide was further added thereto as a radical polymerization initiator to polymerize them at 80° C. for 8 hours under nitrogen gas atmosphere. After finishing the reaction, toluene was added to prepare an acrylic copolymer solution having a solid matter concentration of 34% by weight. The acrylic copolymer thus obtained had a weight average molecular weight of 350,000.

(2) Production of Adhesive Sheet

The isocyanate cross-linking agent ([Colonate L], manufactured by Nippon Polyurethane Co., Ltd.) 3 parts by weight was added to 100 parts by weight of the acrylic copolymer solution obtained in (1) described above to prepare an adhesive.

An adhesive sheet was prepared in the same manner as in Example 1 (2), except that this adhesive was used and coated so that a thickness after drying was 50 $\mu m$.

Comparative Example 1

(1) Preparation of Acrylic Copolymer Solution

The same reactor as in Example 1 was used and charged with 88 parts by weight of 2-ethylhexyl acrylate (2EHA), 2 parts by weight of acrylic acid, 10 parts by weight of vinyl acetate and 150 parts by weight of ethyl acetate, and 0.3 part by weight of azobisisobutyronitrile was further added thereto to polymerize them at 80° C. for 8 hours under nitrogen gas atmosphere. After finishing the reaction, toluene was added to prepare an acrylic copolymer solution having a solid matter concentration of 36% by weight. The acrylic copolymer thus obtained had a weight average molecular weight of 370,000.

(2) Production of Adhesive Sheet

The isocyanate cross-linking agent ([Colonate L], manufactured by Nippon Polyurethane Co., Ltd.) 3 parts by weight was added to 100 parts by weight of the acrylic copolymer solution obtained in (1) described above to prepare an adhesive.

An adhesive sheet was prepared in the same manner as in Example 1 (2), except that this adhesive was used.

Comparative Example 2

(1) Preparation of Acrylic Copolymer Solution

The same reactor as in Example 1 was used and charged with 58 parts by weight of 2-ethylhexyl acrylate, 30 parts by weight of butyl acrylate, 2 parts by weight of acrylic acid, 10 parts by weight of vinyl acetate and 150 parts by weight of ethyl acetate, and 0.3 part by weight of azobisisobutyronitrile was further added thereto to polymerize them at 80° C. for 8 hours under nitrogen gas atmosphere. After finishing the reaction, toluene was added to prepare an acrylic copolymer solution having a solid matter concentration of 32% by weight. The acrylic copolymer thus obtained had a weight average molecular weight of 330,000.

(2) Production of Adhesive Sheet

The isocyanate cross-linking agent ([Colonate L], manufactured by Nippon Polyurethane Co., Ltd.) 3 parts by weight was added to 100 parts by weight of the acrylic copolymer solution obtained in (1) described above to prepare an adhesive.

An adhesive sheet was prepared in the same manner as in Example 1 (2), except that this adhesive was used.

The respective adhesive sheets obtained in Examples 1 to 3 and Comparative Examples 1 and 2 were evaluated for an adhesive strength, a gas-generating amount and an effect to an electronic member according to methods shown below. The results thereof are shown in Table 1.

Evaluation of Adhesive Sheet (1) Adhesive Strength

An adhesive strength to a cold rolled stainless steel plate was measured according to JIS Z0237.

(2) Gas-generating Amount

The adhesive sheet from which the release sheet was peeled and removed was heated at 120° C. for 10 minutes in a purge & trap ([JHS-100A1], manufactured by Nippon Electron Ind. Co., Ltd.) to sample gas, and it was then introduced into GC Mass [Turbo Mass], manufactured by Perkin Elmer Co., Ltd.) to determine an amount of generated gas in terms of a n-decane amount. The amount in terms of a n-decane amount was determined from a calibration curve of n-decane prepared in advance by setting a detection intensity of generated gas obtained by GC Mass as a detection intensity of n-decane.

(3) Effect to Electronic Member

The adhesive sheet was stuck on an extension memory for a personal computer and left standing while heating, and then it was confirmed if the memory was recognized on a personal computer.

The adhesive sheet of 20 mm×115 mm was stuck on an extension memory (for NXJ-E256MB, manufactured by Melco Co., Ltd.), and this was put in a sealed glass vessel and left standing at 80° C. for 168 hours. Then, the memory was connected to a personal computer ([PC-98 Mate MX MA23D], manufactured by NEC Co., Ltd.) to confirm if the memory was operated.

TABLE 1

|  |  |  | Example | | | Comparative Example | |
|---|---|---|---|---|---|---|---|
|  |  |  | 1 | 2 | 3 | 1 | 2 |
| Acrylic Copolymer | Monomer use amount (parts by weight) | BA | 88 | 65 | 48 | — | 30 |
|  |  | EH | — | 30 | 20 | — | — |
|  |  | 2EHA | — | — | — | 88 | 58 |
|  |  | AA | 2 | 2 | 2 | 2 | 2 |
|  |  | VAc | 10 | 3 | 30 | 10 | 10 |
|  | Weight average molecular weight |  | 300,000 | 350,000 | 350,000 | 370,000 | 330,000 |
| Adhesive sheet | Adhesive strength (N/25 mm) |  | 10.4 | 11.8 | 20.1 | 9.3 | 12.5 |
|  | Gas-generating amount ($\mu$g/cm$^2$) |  | 0.18 | 0.31 | 0.89 | 1.43 | 1.20 |
|  | Effect to electronic member |  | Good operation | Good operation | Good operation | Not recognized | Instable operation |

In Comparative Example 1, 2-ethylhexanol (boiling point: 184° C.) originating in 2-ethylhexyl acrylate was detected, and a large amount of gas is generated. Accordingly, an effect to an electronic member is observed.

In Comparative Example 2, butyl acrylate is used for a part of the main component for the acrylic copolymer, so that less amount of gas than in Comparative Example 1 is generated, but an effect to an operability of an electronic member is observed.

Effects of the Invention

According to the present invention, capable of being readily obtained is an adhesive sheet for a precision electronic member which generates less amount of gas under high temperature atmosphere and which is suited as a low polluting adhesive sheet for a precision electronic member.

What is claimed is:

1. An adhesive sheet for a precision electronic member which has an adhesive layer comprising an acrylic copolymer and in which an amount of gas generated in heating at a temperature of 120° C. for 10 minutes is 1.0 $\mu$g/cm$^2$ or less in terms of a n-decane amount, wherein the acrylic copolymer described above is prepared by copolymerizing a monomer mixture which comprises alkyl (meth)acrylate having 4 or less carbon atoms in an alkyl group and vinyl acetate in a proportion of 50:50 to 99.5:0.5 in terms of a weight ratio and in which a total content thereof is 75% by weight or more.

2. The adhesive sheet for a precision electronic member as claimed in claim 1, wherein the acrylic copolymer is prepared by radically copolymerizing alkyl (meth)acrylate having 4 or less carbon atoms in an alkyl group, vinyl acetate and a monomer having a cross-linkable group.

3. The adhesive sheet for a precision electronic member as claimed in claim 1, wherein the weight average molecular weight of the acrylic copolymer is 150,000 or more.

4. A method for producing an adhesive sheet having an adhesive layer which generates gas in an amount of 1.0 $\mu g/cm^2$ or less in terms of n-decane amount when heated at 120° C. for 10 min, which comprises a step of coating an adhesive on one or both surfaces of a base sheet or a release sheet thereby forming the adhesive layer, the adhesive comprising an acrylic copolymer prepared by copolymerizing a monomer mixture comprising an alkyl (meth)acrylate having 4 or less carbon atoms in the alkyl group and vinyl acetate in a weight proportion of 50:50 to 99.5:0.5 and a total content thereof of 75% by weight or more.

5. The method according to claim 4, wherein the coated adhesive is heated at 80 to 150° C. for 30 s to 5 min.

6. The method according to claim 4, wherein the thickness of the adhesive layer is 5 to 200 $\mu m$.

7. The sheet according to claim 1, wherein the alkyl (meth)acrylate is at least one selected from the group consisting of methyl (meth)acrylate, ethyl (meth)acrylate, n-propyl (meth)acrylate, isopropyl (meth)acrylate, n-butyl (meth)acrylate, isobutyl(meth)acrylate, sec-butyl (meth)acrylate, t-butyl (meth)acrylate, and mixtures thereof.

8. The sheet according to claim 1, wherein the weight ratio of alkyl (meth)acrylate and vinyl acetate is 70:30 to 99:1.

9. The sheet according to claim 1, wherein the weight ratio of alkyl (meth)acrylate and vinyl acetate is 80:20 to 90:10.

10. The sheet according to claim 1, wherein said adhesive layer has a thickness of 5 to 200 $\mu m$.

11. The sheet according to claim 1, wherein said adhesive layer has a thickness of 10 to 130 $\mu m$.

12. The adhesive sheet according to claim 1, wherein said adhesive layer is in contact with one or more base sheets.

13. The adhesive sheet according to claim 1, wherein said adhesive layer is in contact with a release sheet.

14. The method according to claim 4, wherein the alkyl (meth)acrylate is at least one selected from the group consisting of methyl (meth)acrylate, ethyl (meth)acrylate, n-propyl (meth)acrylate, isopropyl (meth)acrylate, n-butyl (meth)acrylate, isobutyl(meth)acrylate, sec-butyl (meth)acrylate, t-butyl (meth)acrylate, and mixtures thereof.

15. The method according to claim 4, wherein the weight ratio of alkyl (meth)acrylate and vinyl acetate is 70:30 to 99:1.

16. The method according to claim 4, wherein the weight ratio of alkyl (meth)acrylate and vinyl acetate is 80:20 to 90:10.

17. The method according to claim 4, wherein said adhesive layer has a thickness of 10 to 130 $\mu m$.

* * * * *